United States Patent Office 3,102,888
Patented Sept. 3, 1963

3,102,888
5-[(CARBAMOYLOXY OR OXY SUBSTITUTED PIPERIDINO)-LOWER ALKYLENE] IMINO-DIBENZYLS
Robert Michel Jacob, Ablon-sur-Seine, and Raymond Jacques Horclois, Malakoff, France, assignors to Societe des Usines Chimiques Rhone-Poulenc, Paris, France, a French body corporate
No Drawing. Filed June 24, 1959, Ser. No. 822,438
Claims priority, application France June 28, 1958
6 Claims. (Cl. 260—294.3)

The present invention relates to new iminodibenzyl derivatives, to processes for their preparation, and to pharmaceutical compositions containing them.

The new iminodibenzyl derivatives of the present invention are those of the general formula:

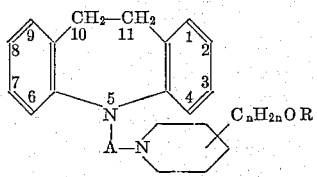

and their acid addition and quaternary ammonium salts in which A represents a straight or branched chain saturated alkylene group containing 2 to 4 carbon atoms at least two of which separate the nitrogen atoms of the iminodibenzyl and piperidine nuclei, R represents a hydrogen atom, or a lower acyl or a carbamoyl group of the formlua

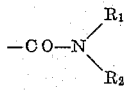

where $R_1$ and $R_2$ are the same or different and represent hydrogen atoms or lower alkyl groups or together with the adjacent nitrogen atom represent a mononuclear heterocyclic ring, and n is 0, 1 or 2. By a "lower" group is meant in this specification and in the appended claims a group containing from 1 to 4 carbon atoms. The group A may, for example, represent any of the following chains:

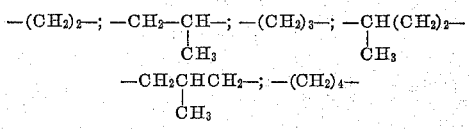

According to features of the invention, the new iminodibenzyl derivatives are prepared by the following processes.

(1) Action on iminodibenzyl of a piperidine of the general formula:

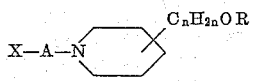
II where X represents a reactive ester residue such as a halogen atom or a sulphuric or sulphonic ester residue and the other symbols are as hereinbefore defined.

(2) Action of a piperidine of the general formula:

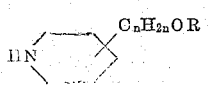
III on an iminodibenzyl derivative of the general formula:

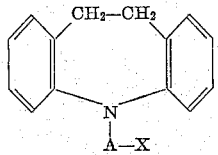
VI where the various symbols are as hereinbefore defined.

These two reactions can be carried out with or without a solvent in the presence or absence of a condensing agent.

In the case of the first reaction, it is advantageous to operate in solution in an aromatic hydrocarbon (for example, toluene or xylene) in the presence of an alkaline condensing agent, preferably an alkali metal or derivative thereof (such as, for example, a hydride, alkoxide, alkyl or aryl derivative) and more especially metallic sodium, lithium hydride, sodium t-butoxide, butyllithium and phenyllithium. Preferably, the operation is carried out at the boiling temperature of the solvent. It is advantageous to use the reactive ester of Formula II in the form of a free base in solution, for example, in benzene, toluene or xylene and to add it to the mixture of the other reactants, in which the iminodibenzyl employed may already be present at least in part, as an alkali metal salt. The reaction may also be carried out with a salt of the reactive ester, but in this case it is obviously necessary to employ a larger proportion of condensing agent so as to neutralise the acid of the salt employed.

It is advantageous in the case of the second reaction to use an acid binding agent such as an alkali metal carbonate or an excess of the piperidine compound and to operate in an alcohol or aromatic hydrocarbon as solvent at a temperature between 50° and 150° C.

In both reactions when the product is one in which R represents a hydrogen atom it is particularly advantageous initially to form the tetrahydropyranyl derivative of the compound of Formula II or III and, after the reaction, to decompose the product to liberate the free hydroxyl group.

(3) In the case of the products of Formula I in which R represents an acyl group, acylation by known methods of the alcohols conforming to the general Formula I in which R is a hydrogen atom. Such methods include the use of an acid halide or anhydride in an inert solvent, with or without heating to accelerate the reaction.

(4) In the case of the products of Formula I in which R represents a carbamoyl group, carbamoylation by known methods of the alcohols corresponding to the general Formula I in which R is a hydrogen atom. Such methods include the action of isocyanic acid or a lower alkyl isocyanate, of a carbamoyl halide, or of phosgene and an amine on the said alcohol.

The expression "known methods" as used herein means methods heretofore used or described in the chemical literature.

The new iminodibenzyl derivatives of Formula I can be converted into their acid addition salts or quaternary ammonium derivatives by known methods. The addition salts can be obtained for example by action of the new derivatives on acids in appropriate solvents. There are employed as organic solvents, for example, alcohols or ethers, while water is advantageously employed when an inorganic solvent is required. The formed salt precipitates after optional concentration of its solution and is separated by for example filtration or decantation. The quaternary ammonium derivatives can be obtained by the action of the new iminodibenzyl derivatives on reactive esters, optionally in an organic solvent, at room temperature or, more rapidly, with slight heating.

The new iminodibenzyl derivatives of Formula I can be purified by physical methods such as distillation, crystallisation or chromatography, or by chemical methods such as formation of salts followed by crystallisation and decomposition of the latter with alkali. In these operations, the nature of the anion of the salt is immaterial, and the only condition of the applicability of the process is that the salt should be well-defined and readily crystallisable.

These new derivatives of Formula I possess inter alia useful pharmacodynamic properties, and they are more particularly valuable psychotonics, antihistaminics and anti-emetics. Compounds of outstanding utility are those in which the group A in general Formula I is a —(CH$_2$)$_2$— or —(CH$_2$)$_3$— group.

For therapeutic purposes, the bases of general Formula I are preferably employed as such or in the form of non-toxic acid addition salts i.e. salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side effects ascribable to the anions. However, they may also be employed in the form of non-toxic quaternary ammonium salts obtained by reaction with organic hailides (e.g. methyl or ethyl iodide, chloride or bromide or allyl or benzyl chloride or bromide) or other reactive esters, e.g. toluene-p-sulphonates.

The invention is illustrated by the following examples.

*Example I*

A solution of 5-(3-toluene-p-sulphonyloxy-propyl) iminodibenzyl (20.35 g.) and 4-hydroxypiperidine (10.2 g.) in anhydrous toluene (100 cc.) is boiled under reflux for 4 hours. After cooling, distilled water (200 cc.) is added, and the aqueous layer is decanted. The toluene solution is washed with distilled water (200 cc.) and then extracted with normal hydrochloric acid (100 cc.). The hydrochloric acid solution is made alkaline to phenolphthalein with sodium hydroxide solution ($d=1.33$). The base which separates is extracted with chloroform (100 cc.). The chloroform solution is dried over anhydrous sodium sulphate and then evaporated to dryness. There is obtained 5-[3-(4-hydroxy-1-piperidyl)propyl]iminodibenzyl, (16.8 g.) of which the hydrochloride, crystallised from acetone, melts at 211–213° C.

The initial 5-(3-toluene-p-sulphonyloxypropyl)iminodibenzyl is prepared in the following manner: a solution of iminodibenzyl (58.5 g.) in anhydrous toluene (250 cc.) is heated at 90° C. Sodamide (13.65 g.) is added, whereafter the mixture is heated to 110° C. A solution of 1-chloro3-tetrahydropyranyloxypropane (62.5 g.) in anhydrous toluene (100 cc.) is added over 2⅔ hours. When the addition is complete, the mixture is further heated for 5 hours at 110° C. After cooling, distilled water (200 cc.) is added. The product is agitated for 10 minutes, and the aqueous solution is separated. The toluene solution is treated with ethanol (1750 cc.) and then with hydrochloric acid (250 cc.; $d=1.19$, diluted to a concentration of 25%). The product is allowed to stand for 2 hours at 20° C., and is then evaporated to dryness in vacuo. The residue is dissolved in chloroform (600 cc.). The chloroform solution is washed with distilled water (800 cc. in four lots). The chloroform is driven off and the residue is then distilled in vacuo. There is obtained 5-(3-hydroxypropyl)-iminodibenzyl (51 g.; B.P. 0.8 mm.=185–200° C.). A solution of 5-(3-hydroxypropyl)-iminodibenzyl (50 g.) in anhydrous pyridine (220 cc.) is cooled in iced water to +2° C. Toluene-p-sulphonyl chloride (37.5 g.) is added over 15 minutes. The mixture is allowed to stand for 18 hours at 0° C. whereafter iced water (1 l.) is added. The product crystallises and the crystals are filtered off, washed with iced water (200 cc.) and then dried at 45° C. in vacuo. After recrystallisation from ethanol (200 cc.), there is obtained 5-(3-toluene - p - sulphonyloxypropyl)iminodibenzyl (53 g.) melting at 100–102° C.

*Example II*

5-(2-toluene-p-sulphonyloxyethyl)iminodibenzyl (19.7 g.) is heated under reflux for 7 hours with 4-hydroxypiperidine (10.3 g.) in toluene (130 cc.). The mixture is treated with water and with hydrochloric acid. The base is liberated with sodium hydroxide and extracted with chloroform. There is obtained 5-[2-(4-hydroxy-1-piperidyl)ethyl]iminodibenzyl (15 g.), which melts at 92° C. after recrystallisation from benzene.

The hydrochloride prepared with ethereal hydrogen chloride in isopropanol melts at 250° C.

*Example III*

5-[2-(4-hydroxy-1-piperidyl)ethyl]iminodibenzyl (3.7 g.) is heated at 70° C. for 7 hours in a shaker-type stainless steel autoclave with benzene (60 cc.) and methyl isocyanate (1.75 g.). After concentration under reduced pressure, the hydrochloride is prepared in isopropanol with ethereal hydrogen chloride. There is obtained 5-[2 - (4 - methylcarbamoyloxy - 1 - piperidyl)ethyl] - iminodibenzyl hydrochloride (2.8 g.), melting at 152° C.

*Example IV*

5-[2-(4-hydroxy-1-piperidyl)ethyl]iminodibenzyl (4 g.) is heated under reflux for 1½ hours with benzene (40 cc.) and sodamide (0.5 g.). The mixture is allowed to cool to about 50° C. and a solution of dimethylcarbamoyl chloride (1.35 g.) in benzene (10 cc.) is added. The mixture is heated under reflux for 3 hours and treated with water and hydrochloric acid. The base is liberated by means of sodium hydroxide and extracted with chloroform. After concentration under reduced pressure, the hydrochloride is prepared in ether. There is obtained 5 - [2 - (4 - dimethylcarbamoyloxy - piperidyl)ethyl] iminodibenzyl hydrochloride (2.4 g.) melting at 174° C.

*Example V*

By proceeding as in Example II, starting with 5-(2-toluene-p-sulphonyloxyethyl)iminodibenzyl (12.9 g.) and 4-β-hydroxyethylpiperidine (8.3 g.), there is obtained 5-[2 -(4 - β - hydroxyethyl - 1 - piperidly)ethyl]iminodibenzyl (5.2 g.) which, after recrystallisation from isopropanol melts at 174° C.

*Example VI*

By proceeding as in Example III, starting with 5-[2-(4 - β - hydroxyethyl - 1 - piperidyl)ethyl]iminodibenzyl (3 g.) and methyl isocyanate (1.8 g.), there is obtained, on addition of ether to the benzene solution, 5-[2-(4-β-methylcarbamoyloxyethyl - 1 - piperidyl)ethyl]iminodibenzyl (1.4 g.), melting at about 90° C.

*Example VII*

By proceeding as in Example II, starting with 5-(2-toluene-p-sulphonyloxypropyl)iminodibenzyl (10.9 g.) and 4-hydroxypiperidine (5.4 g.), there is obtained in isopropanol 5 - [2 - (4 - hydroxy - 1 - piperidyl)propyl]iminodibenzyl hydrochloride (5 g.), melting at 215° C.

*Example VIII*

By proceeeding as in Example III, starting with 5-[3 - (4-hydroxy - 1 - piperidyl)propyl]iminodibenzyl (8.5 g.) and methyl isocyanate (3.5 g.) there is obtained, after recrystallisation from benzene, 5-[3-(4-methylcarbamoyloxy - 1 - piperidyl)propyl]iminodibenzyl (5.8 g.), melting at 102° C.

*Example IX*

By proceeding as in Example II, starting with 5-(3-toluene-p-sulphonyloxypropyl)iminodibenzyl (12.2 g. and 4-hydroxymethylpiperidine (6.9 g.), there is obtained 5 - [3 - (4 - hydroxymethyl - 1 - piperidyl)propyl]iminodibenzyl (8.3 g.), which melts at 115° C. after recrystallisation from a 50% mixture of ethanol and water.

Example X

By proceeding as in Example III, starting with 5-[3-(4 - hydroxymethyl - 1 - piperidyl)propyl]iminobenzyl (7 g.), and methyl isocyanate (2.9 g.), there is obtained, after purification by chromatography through a column of alumina, 5-[3-(4-methylcarbamoyloxymethyl-1-piperidyl)propyl]iminodibenzyl (6.8 g.), which melts at 105° C. after recrystallisation from petrol (B.P. 70°–120° C.).

Example XI

By proceeding as in Example II, starting with 5-[3-(toluene - p - sulphonyloxy)propyl]iminodibenzyl (16.3 g.) and 4-$\beta$-hydroxyethylpiperidine (10.3 g.), there is obtained 5-[3-(4-$\beta$-hydroxyethyl-1-piperidyl)propyl]iminodibenzyl (12.5 g.), which melts at 113° C. after recrystallisation from ethyl acetate.

Example XII

By proceeding as in Example III, starting with 5-[3-(4 - $\beta$ - hydroxyethyl- 1 - piperidyl)propyl]iminodibenzyl (5.8 g.) and methyl isocyanate (2.3 g.), there is obtained 5 - [3 - (4 - $\beta$ - methylcarbamoyloxyethyl - 1-piperidyl)propyl]iminodibenzyl (5.8 g.), which melts at 120° C. after recrystallisation from cyclohexane.

Example XIII

By proceeding as in Example II, starting with 5-(3-toluene-p-sulphonyloxypropyl)iminodibenzyl (46 g.) and 3-hydroxypiperidine (23 g.), there is obtained a base, which is purified by chromatography through alumina, and distillation at 212–215° C. under 0.25 mm. Hg. There is obtained 5-[3-(3-hydroxy-1-piperidyl)propyl]-iminodibenzyl (21.5 g.). The hydrochloride, prepared in isopropanol, melts at 214° C.

Example XIV

By proceeding as in Example III, starting with 5-[3-(3-hydroxy-1-piperidyl)propyl]iminodibenzyl (6.5 g.) and methyl isocyanate (2.9 g.), there is obtained in ether 5-[3 - (3-methylcarbamoyloxy-1-piperidyl)propyl]-iminodibenzyl hydrochloride (5.3 g.), melting at 150° C.

Example XV

By proceeding as in Example II, starting with 5-(3-toluene-p-sulphonyloxypropyl)iminodibenzyl (8.15 g.) and 3-hydroxymethylpiperidine (5.3 g.), there is obtained a base which is purified by chromatography through alumina. 5-[3-(3-hydroxymethyl-1-piperidyl)propyl]iminodibenzyl hydrochloride, melting at about 155° C., is prepared in ether.

The present invention includes within its scope pharmaceutical compositions which comprise one or more compounds of general Formula I or their acid addition or quaternary ammonium salts as aforesaid together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of the invention with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time.

We claim:

1. A member of the class consisting of the iminodibenzyl derivatives of the formula:

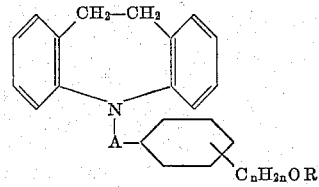

and their non-toxic acid addition salts, wherein A is selected from the class consisting of straight and branched chain saturated alkylene groups containing 2 to 4 carbon atoms at least two of which separate the nitrogen atoms of the iminodibenzyl and piperidine nuclei, R is selected from the class consisting of hydrogen atoms and carbamoyl grooups of the formula

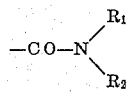

where $R_1$ and $R_2$ are members of the class consisting of hydrogen atoms and alkyl groups containing 1 to 4 carbon atoms, and $n$ is selected from the class consisting of zero, one and two.

2. A member of the class consisting of 5-[3-(4-hydroxy-1-piperidyl)propyl]iminodibenzyl and its non-toxic acid addition salts.

3. A member of the class consisting of 5-[3-(4-methylcarbamoyloxy-1-piperidyl)propyl]iminodibenzyl and its non-toxic acid addition salts.

4. A member of the class consisting of 5-[3-(4-hydroxymethyl-1-piperidyl)propyl]iminodibenzyl and its non-toxic acid addition salts.

5. A member of the class consisting of 5-[3-4-methylcarbamoyloxymethyl - 1 - piperidyl)propyl]iminodibenzyl and its non-toxic acid addition salts.

6. A member of the class consisting of 5-[3-(3-methylcarbamoyloxy-1-piperidyl)propyl]iminodibenzyl and its non-toxic acid addition salts.

No references cited.